(12) United States Patent
Paul et al.

(10) Patent No.: US 6,418,885 B1
(45) Date of Patent: Jul. 16, 2002

(54) TOTAL ENERGY GENERAL OPTIMIZED ENGINE CYCLE

(76) Inventors: Marius A. Paul; Ana Paul, both of 20410 Via Canarias, Yorba Linda, CA (US) 92631

( * ) Notice: Subject to any disclaimer, the term of this patent is extended or adjusted under 35 U.S.C. 154(b) by 0 days.

(21) Appl. No.: 09/637,506

(22) Filed: Aug. 11, 2000

Related U.S. Application Data

(63) Continuation-in-part of application No. 09/590,156, filed on Jun. 7, 2000.
(60) Provisional application No. 60/190,303, filed on Mar. 17, 2000.

(51) Int. Cl.$^7$ .......................... F02B 47/00; F02M 37/04
(52) U.S. Cl. .................. 123/25 C; 123/299; 123/446; 123/458; 123/514
(58) Field of Search .......................... 123/458, 446, 123/299, 305, 514, 497, 25 C

(56) References Cited

U.S. PATENT DOCUMENTS

| | | | | |
|---|---|---|---|---|
| 4,858,579 A | * | 8/1989 | Elsbett et al. | 123/299 |
| 5,445,129 A | * | 8/1995 | Barnes | 123/446 |
| 5,642,716 A | * | 7/1997 | Ricco | 123/456 |

* cited by examiner

*Primary Examiner*—Noah P. Kamen
(74) *Attorney, Agent, or Firm*—Richard Esty Peterson

(57) ABSTRACT

A high pressure internal combustion engine having a triple thermal cycle system for improved cooling and combustion utilizing an annular volume surrounding the cylinder having a connecting passage to the combustion chamber allowing air to enter the volume on compression, and a water injection system for injecting water into the volume during initiation of combustion, the water spray changing to steam to drive the air into the combustion chamber during combustion, the air, steam and combustion gases mixing and improving the engine efficiency, the system being combinable with an injection system that conserves energy by pumping high pressure fluid only during the injection process.

21 Claims, 12 Drawing Sheets

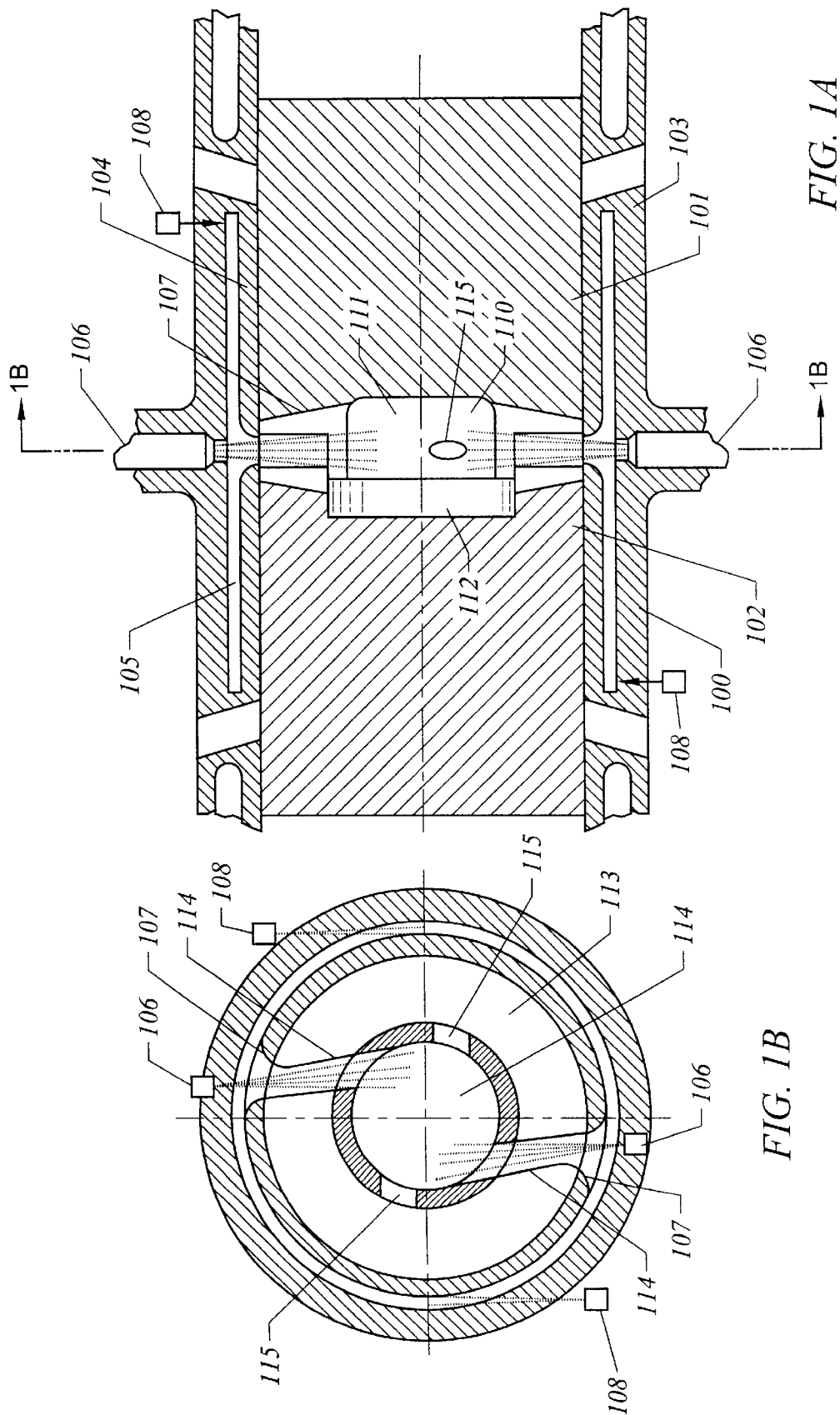

TOTAL ENERGY GENERAL OPTIMIZED ENGINE CYCLE

This application is a continuation-in-part of our application of the same title, Ser. No. 09/590,156, filed Jun. 7, 2000 and claims the benefit of provisional application Serial No. 60/190,303, filed Mar. 17, 2000.

BACKGROUND OF THE INVENTION

The invention of this application relates to the subject matter of our U.S. Pat. No. 5,042,441, issued Aug. 27, 1991 entitled "Low Emission Combustion System For Internal Combustion Engines," and U.S. Pat. No. 5,081,961, issued Jan. 21, 1992 entitled, "Internal Combustion Engine With Rotary Exhaust Control." The referenced patents describe opposed piston engines that are capable of generating enormous power densities by a design that can achieve ultra-high compression/combustion pressures of over 300 bars. When the opposed piston engine designs are associated with auxiliary super-charging or turbo-charging systems to create a five, ten and fifteen atmospheric boost, a tremendous thermal energy density per cycle can be achieved.

This ability to generate an unprecedented power density in an engine device provides the opportunity to incorporate internal co-generation using a Rankin cycle combined with an internal air cooling cycle with thermal recovery and regeneration in association with and coincident with the internal combustion cycle. This integration of cycles forms a total energy thermal cycle or a "triple cycle" operating system.

In a conventional internal combustion engine the operating cycle is usually associated with an energy balance made up of 30% thermal efficiency, 30% cooling energy rejection, 30% exhaust energy and 10% friction.

At very high levels of air charging, where the air charge is boosted at 5, 10 or 15 bars, the thermal energy to be rejected by cooling and exhaust reaches an intensity that threatens the integrity of the structural components of the engine. Normal cooling by transferring excess heat through cylinder walls to a cooling system is inadequate to prevent thermal stresses in the cylinder and exhaust components of the hyper-charged engine.

Conventional cooling technologies cannot manage the combined thermal stress and mechanical stress generated by the ultra high pressure and ultra high power density which the opposed piston engine designs, in particular, are capable of producing.

However, novel cooling techniques and controlled injection processes described in this application permit a controlled combustion and a regenerative and cogenerative cooling.

SUMMARY OF THE INVENTION

This invention relates to a controlled injection process and a combined cycle cooling process for internal combustion engines for minimizing thermal losses and mechanical losses in high pressure reciprocal engines.

In an engine of the general type, having an ultra high energy density, it is desirable to have a cooling system that has the capability to work in an internal regeneration/cogeneration mode, where thermal energy extracted during cooling is recovered as useful power. The "triple cycle" cooling system of this invention uses a regenerative air charge to cool the cylinder liner and a water injection to drive the air charge and cogenerate energy in a Rankin cycle.

In a preferred embodiment, the engine cylinder is surrounded by a cylindrical and concentric air-gap form an annular volume with a first mission to forming an insulating thermal barrier or air jacket. In the compression stroke a part of the compressed air invades this annular insulating volume. The compressed air absorbs a part of the heat transferred through the internal wall or liner of the cylinder. At the end of compression and coincident with the time of fuel injection, high-pressure, pure water is tangentially injected at the bottom of the air-gap. The high circular speed of convection and conversion to steam absorbs the rest of the excess thermal energy, transforming this heat into high-pressure, internally cogenerated steam. This steam pushes the heated air back into the combustion chamber of the engine. The compressed air, pre-heated and tangentially re-injected into the combustion chamber during the process of combustion, produces major improvements in completing combustion and increasing the thermal efficiency of the engine. The compressed air is followed by the injection of steam during the same combustion process, the final result being a combined working fluid formed from combustion gases, heat regenerating compressed air, and cogenerating steam. The total energy, triple thermal cycle has a potential for a maximum thermal efficiency of 80–90%. The super high turbulence produced by the tangentially re-injected, high-speed and high-pressure air, and the associated injected steam has a major effect in producing a super clean combustion, with ultra low or zero emission.

Controlling the temperature of the combustion by the air and steam injection, the formation of nox and other pollutants is virtually eliminated.

Even the friction loss of the piston is transformed as heat in the cylinder liner and is then, by thermal combustion, transferred back to the working fluid and recovered by the internal cooling air of regeneration and the steam of cogeneration.

The fuel injection and the water injection are preferably accomplished by a novel concept of a sequential, common rail injection system. The injection system advantageously works in conjunction with the total energy, triple thermal cycle to minimize both thermal and mechanical losses in high pressure engine systems, or in other systems where high pressure, hydraulic pumping systems result in losses in overall engine efficiency.

BRIEF DESCRIPTION OF THE DRAWINGS

FIG. 1A is a partial cross-sectional view of an engine cylinder in an opposed piston engine.

FIG. 1B is a cross-section of the engine cylinder of FIG. 1A taken on the lines 1B—1B in FIG. 1A.

DETAILED DESCRIPTION OF THE PREFERRED EMBODIMENTS

Figure 2A:
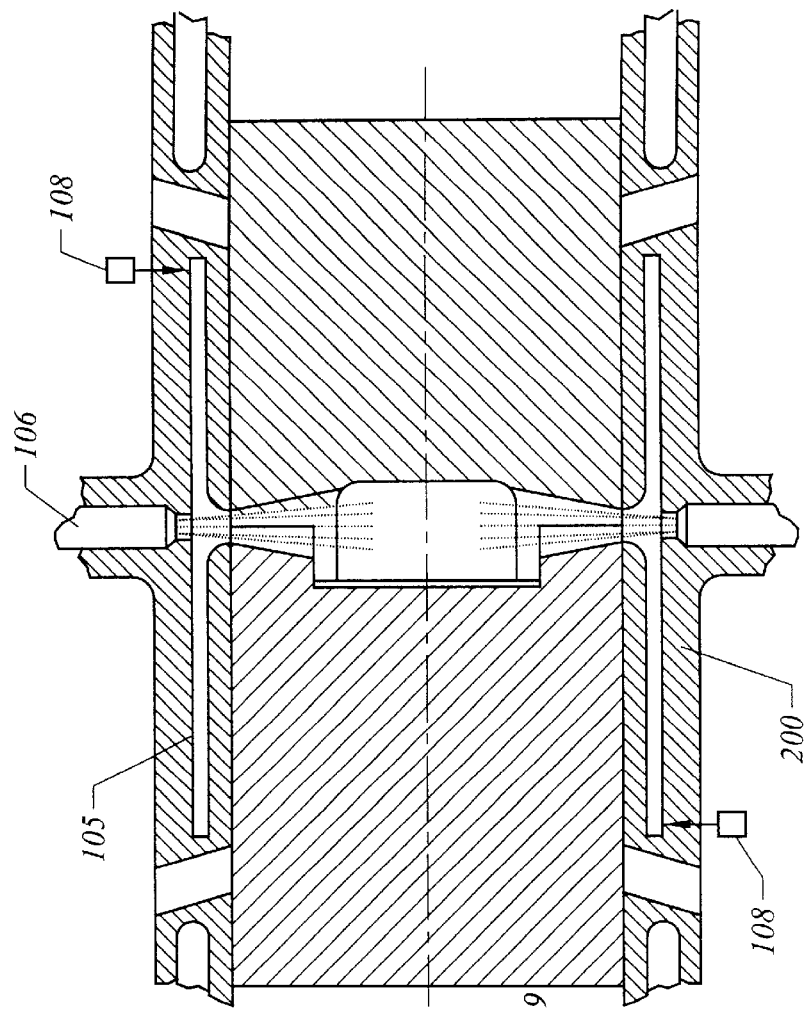
FIG. 2A is a partial cross-sectional view of an engine cylinder of an opposed piston engine.

The triple thermal cycle system for internal combustion engines is described with reference to its preferred implementation as an opposed piston engine of the type described in the referenced patents. Referring to FIG. 1A and FIG. 1B, a cross-sectional view of the combustion chamber portion of an opposed piston engine 100 is shown. The engine 100 has two pistons 101 and 102 in a single engine cylinder 103. The cylinder is formed with a structural housing having an inner sleeve or liner 104 encircled by an air gap envelope 105. The inner sleeve or liner 104 is a thermally conductive structural member that separates the piston cylinder from the annular volume that forms a cooling jacket.

In the embodiment of FIG. 1A and FIG. 1B, the engine 100 is provided with two opposed fuel injectors 106 and two water injectors 108, shown schematically. The opposed pistons 101 and 102 are shown approaching top dead center with a circular crown 110 of the piston 101 forming the perimeter of an inner combustion chamber 111. The circular crown 110 of piston 101 is shown penetrating a recessed combustion chamber 112 in the opposite piston 102.

By this conjunction, the crown 110 separates the peripheral volume 113 from the central volume 114. During the progression of the two pistons toward the top dead center of the piston cycle, the perimeter air in the peripheral volume 113 is forced through the crown 110 to the central volume 114 through tangential ports 115 and flared injection passages 107. The tangential orientation of the ports 115 and passages 107 creates a turbulent, high-speed, spiral air movement in the central combustion chambers 111 and 112.

During the process of compression, a part of the air between the pistons 101 and 102 is transferred from the cylinder 103 to penetrate the air gap 105 where it compresses and absorbs part of the heat transferred from the cylinder liner 104.

At the end of the compression stroke of the pistons, the substantially simultaneous injection of fuel by the fuel injectors 106 and water injectors 108 is commenced.

Water injected into the air gap 105 by the water injectors 108 is instantly converted to steam, driving the compressed air through the circular crown into the 110 central volume 114 cooling the cylinder 103, and particularly the cylinder liner 104 which absorbs a part of the thermal energy of combustion, cutoff The fuel injected into the central volume 114 is turbulently mixed with compressed air squished from the peripheral volume 113 and driven from the air gap 105 by the co-generated steam through constricted passages in the form of tangential ports 115 and injection passages 107 in the piston crown 110.

The result is a "triple thermal cycle" of energy recovery wherein the thermal energy of combustion is recovered by the cycled air to the air gap envelope, the cogeneration of the Rankin cycle in converting injected water to steam in the air gap envelope and the primary combustion in the central combustion chambers 111 and 112, which is supplemented by the air cooling and steam cooling cycles for the mechanical work output. Additionally, since the primary friction losses result from the piston/cylinder contact which converts friction to heat. This thermal energy is also recovered by the air cooling and water-steam conversion cooling in the air gap envelope since the heat of friction is transferred. Virtually all energy generated in the engine is compounded in the development of an effective maximum power output.

Figure 2B:
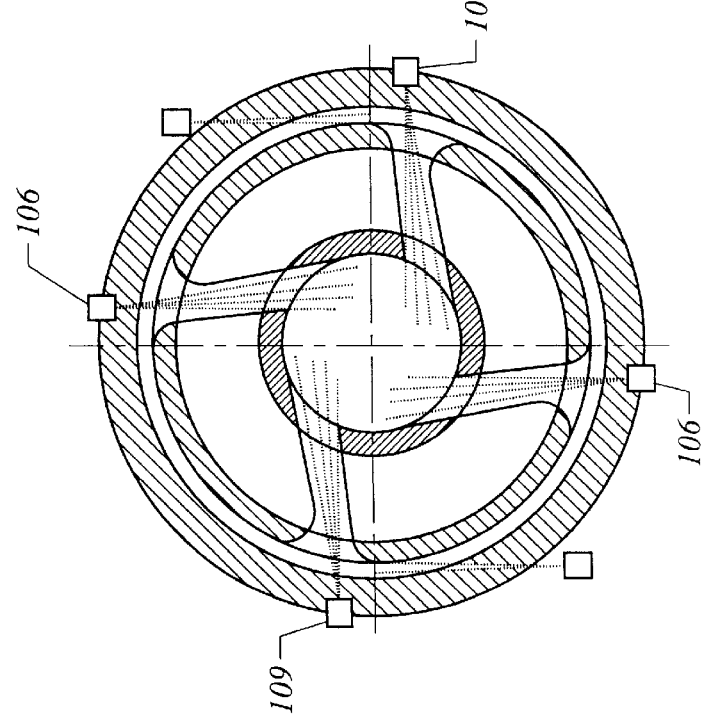
FIG. 2B is a cross-section of the engine cylinder of FIG. 2A taken on lines 2B—2B in FIG. 2A.

Referring now to the alternate embodiment of FIG. 2A and FIG. 2B, the opposed piston engine 200 is configured and operated in the same manner as the engine 100 of FIG. 1A and FIG. 1B, but with two additional fuel injectors 109, as schematically illustrated in FIG. 2B. Notably, the tangential ports 115 are replaced by injector passages 107 as previously described.

Figure 3:
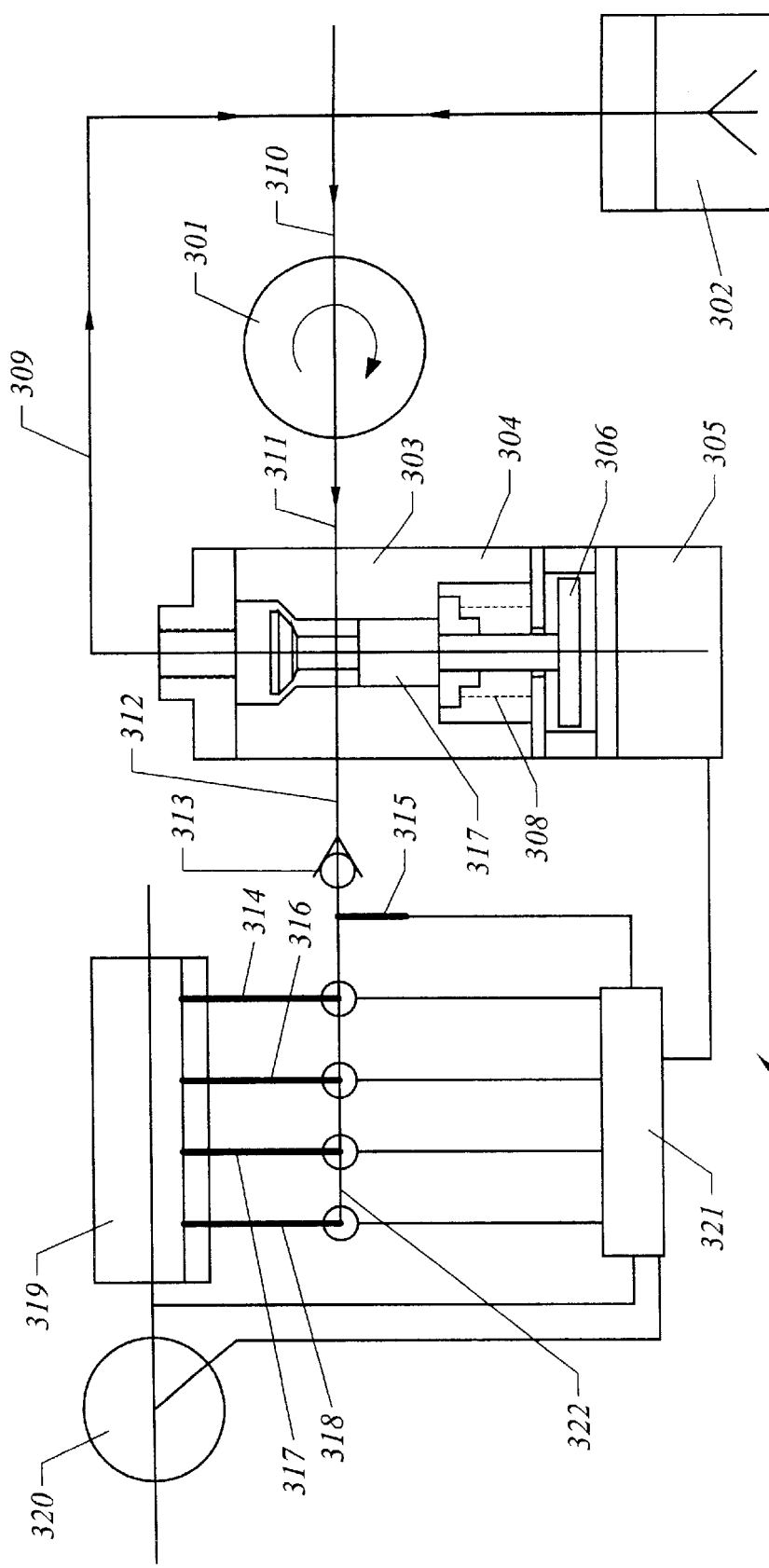
FIG. 3 is a schematic illustration of a sequential, common rail injection system adapted for a conventional engine.

Referring to FIG. 3, a "common rail sequential injection system" is shown and designated generally by the reference numeral 300. The injection system 300 includes a hydraulic pump 301 that receives a liquid, which is fuel or water, depending on the system implemented, from a reservoir 302. The hydraulic pump 301 pumps the liquid to the electro-hydraulic valve 303, which has a body 304 with a solenoid actuator 305 attracting armature plate 306 connected to the spool or poppet valve 307. A return bypass conduit 309 with supply conduits 310 and 311 form a low pressure supply circuit for circulating the liquid around at low pressure with minimum expended energy, so long as the valve 307 is open.

At the proper moment of injection, the electro hydraulic valve 307 is energize closing the bypass conduit 309. The high pressure liquid is conducted through conduit 312, check valve 313, toward the injector 314, for example, which is electronically opened for injection under the command of the electronic control module 321.

The level of the injection pressure is measured and controlled by the transducer 315, informing the electronic control module 321, which in turn controls the output of the pump 301 for maintaining a constant injection pressure only during the injection time. During the rest of the time, the pump 301 operates as a fluid circulating pump.

At the end of the injection of the injector 314, the electro-hydraulic valve 303 is de-energized simultaneously with the closing of the injector 314. The check valve 313 conserves the pressure in the rail 322, when the electro-hydraulic valve 303 is discharging the liquid through the bypass circuit of conduits 309, 310 and 311, and the open valve 303, eliminating the energy consumption between the injections.

When the injectors 316, 317, 318, etc. must inject, the electro-hydraulic valve 303 is sequentially energized repeating the same process of sequential injection.

The engine 321 is driving the encoder 320 which is the timing trigger for the actions of the electronic control module 321.

Figure 4:
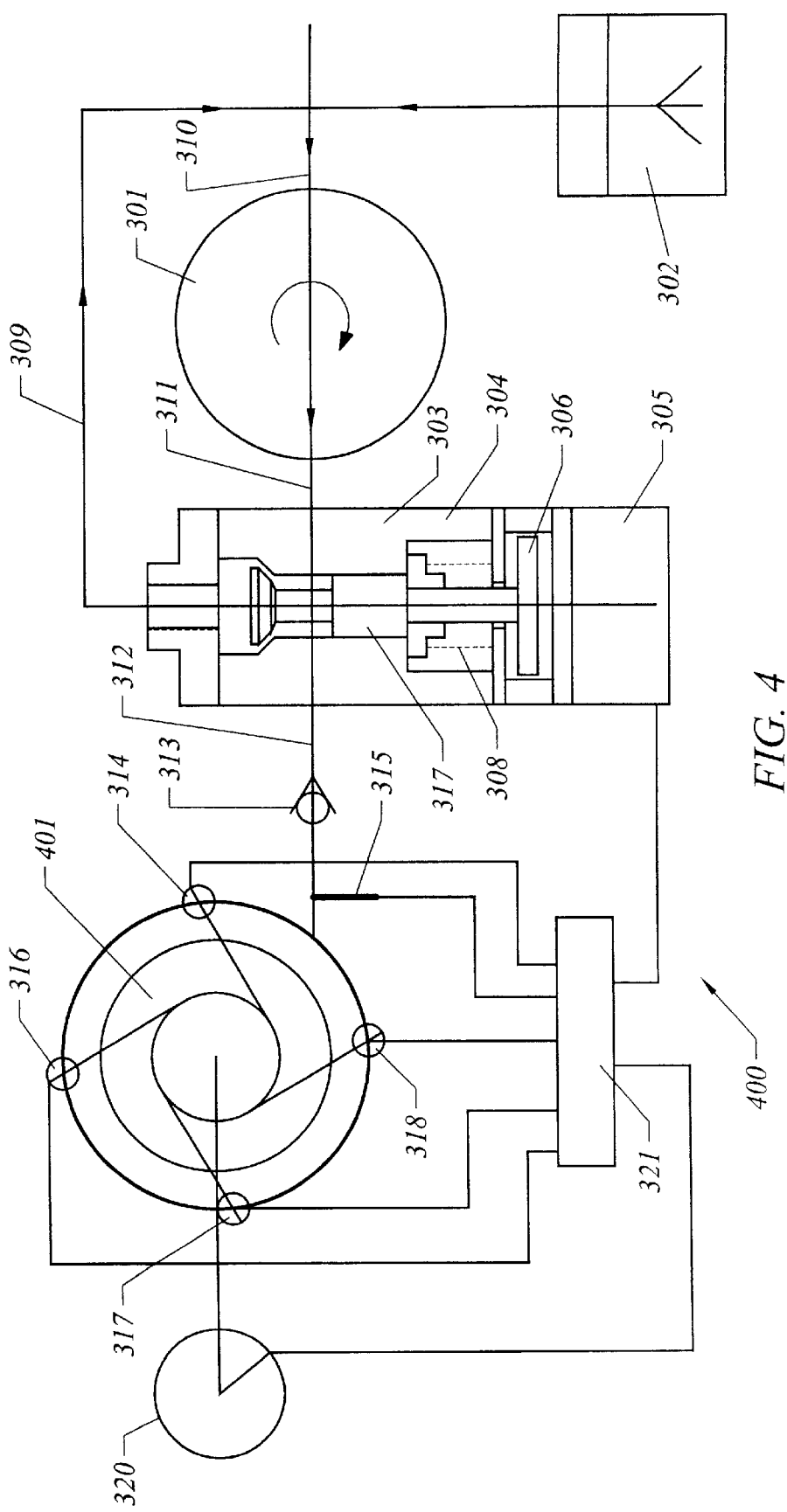
FIG. 4 is the sequential, common rail injection system of FIG. 3 adapted to an opposed piston engine.

In the embodiment of FIG. 4, the engine 400 is of the opposed piston type as shown in FIGS. 1A and 2B, with two or four injectors, the specific embodiment of FIG. 4 showing four injectors 314, 316, 317 and 318 arranged around the engine cylinder 402 for tangential injection into the combustion chamber 401, as schematically illustrated.

The fundamental difference from the sequential common rail injection system depicted in the FIG. 3, is that all four injectors are injecting in a continuous overlapped injection:

1. - - - - - - - - - - - - - - - - - - - - - - - -
2. - - - - - - - - - - - - - - - - - - - - - - -
3. - - - - - - - - - - - - - - - - - - - - - -
4. - - - - - - - - - - - - - - - - - - - - - with no more than a 3–5 degree interval between injections and no more than 30 degree total injection time.

During each injection cycle the injection process is sequentially divided by the four injectors which inject fuel in this embodiment into the single combustion chamber 401.

The total time of the energized electro-hydraulic valve 303 is the 30-degree phase in which time individual injectors are sequentially energized, activated and de-activated. The rest of the 330 degrees of the total cycle time (two stroke engine), or 690 degree cycle (four stroke engine) the high pressure pump 301 is de-activated by the de-energized electro-hydraulic valve 303, which opens the by-pass circuit of conduits 309, 310 and 311 with the pump 301 operating as a low pressure circulating pump.

This de-activation of the common rail pump 301 in the time of non-injection produces a significant reduction of the energy lost by conventional common rail injection systems.

The sequential common rail injection system can also be used for water injection for an internal cogeneration cycle for conventional or ultra high-pressure opposed piston engines. Similar applications can involve the injection of other liquids such as alcohols, hydro ammonia, liquid natural gas, hydrogen alone or in combination with other petroleum fuels.

The fundamental principles of our invention can be applied to all existing and new engines, in any and all potential combinations, without departing from the spirit of the invention.

Figure 5:
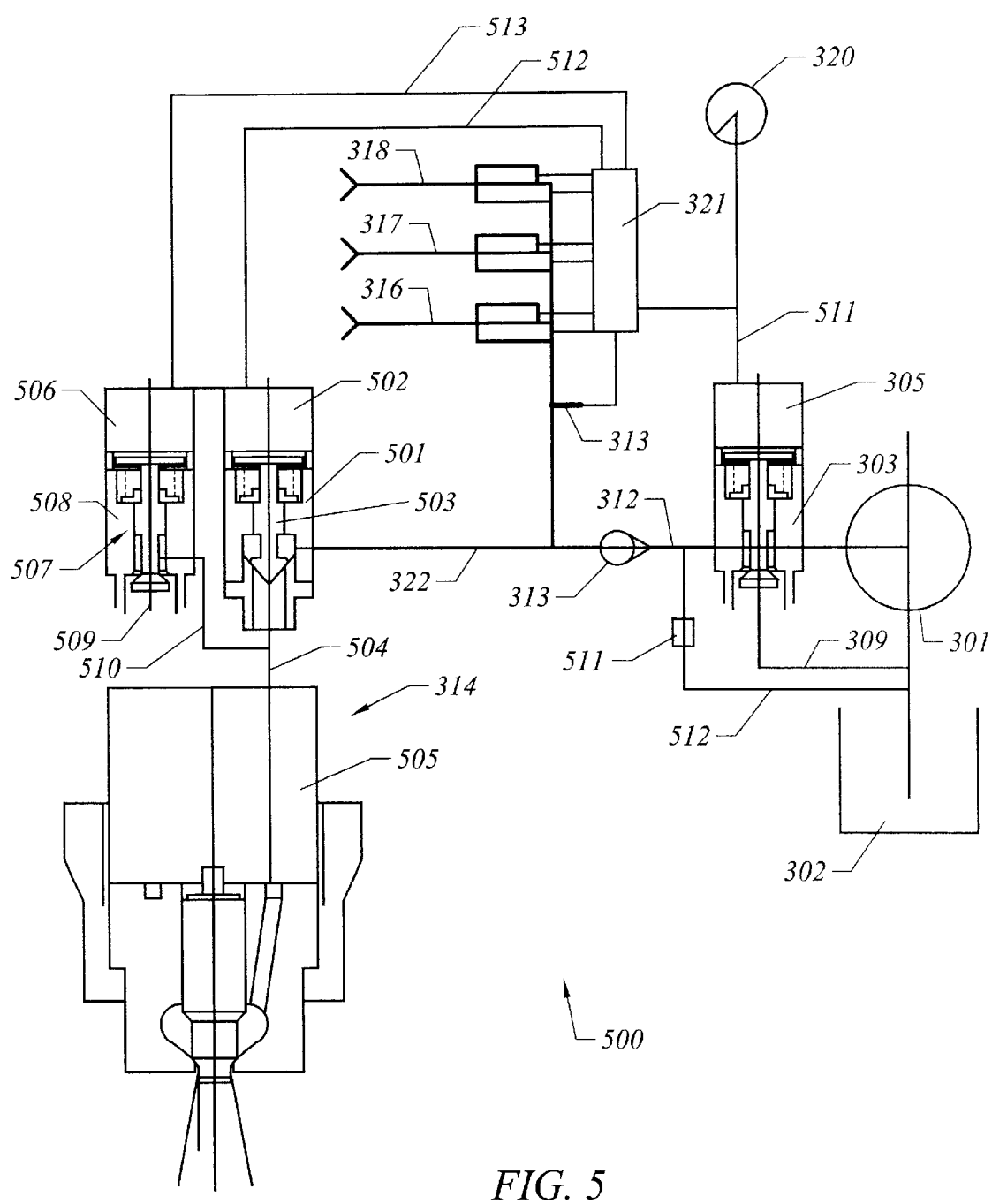
FIG. 5 is a schematic illustration of a sequential, common rail injection system having a controlled injection cutoff.

Referring now to FIG. 5, the components of the sequential, common rail injection system 500 are illustrated with an exemplar injector 314 from the arrangement of FIG. 3. The injector 314 has an injector body 505 connected by a liquid supply line 504 to an electro-hydraulic valve 501. The electro-hydraulic valve 501 has a solenoid 502 and an actuatable discharge valve spool 503, and is connected to the injector 314 by supply line 504. The electro-hydraulic discharge valve 507 has a solenoid 506 and an actuatable discharge valve spool 508 connected to bypass line 510 and discharge line 509 for timely relief of pressure in the liquid supply line 504.

In operation the modular sequential injection system starts the injection by a command from the electronic control module 321 that is triggered by the cycle timing encoder 320. The electronic command causes the energizing of solenoid 305 closing the valve 303 thereby pressurizing the common rail 322; energizing solenoid 502, which opens valve 501, pressurizing the injector 314 through line 504 connected to injector housing 505; and, energizing solenoid 506 closing the valve 507 preventing flow through bypass line 510.

The modular sequential injection system 500 stops the injection process by a command from the electronic control module 321 by de-energizing the solenoids 305, 502, and 506. The common rail pressure system is thereby relieved by the opening of valves 305 and 507 and the closing of valve 503. The electro-hydraulic valve 301 will be relaxed until the next sequential injection of the companion injectors 316, 317, and 318, schematically illustrated in FIG. 5. The check valve 313 conserves the pressure in the common rail 322 until the next injection. To prevent over-pressurization of the common rail, a pressure relief valve 511 in return line 512 limits rail pressure to a preset maximum pressure. The sequentially operated injectors 316, 317, and 318 repeat the same operation as described for injector 314.

Figure 6:
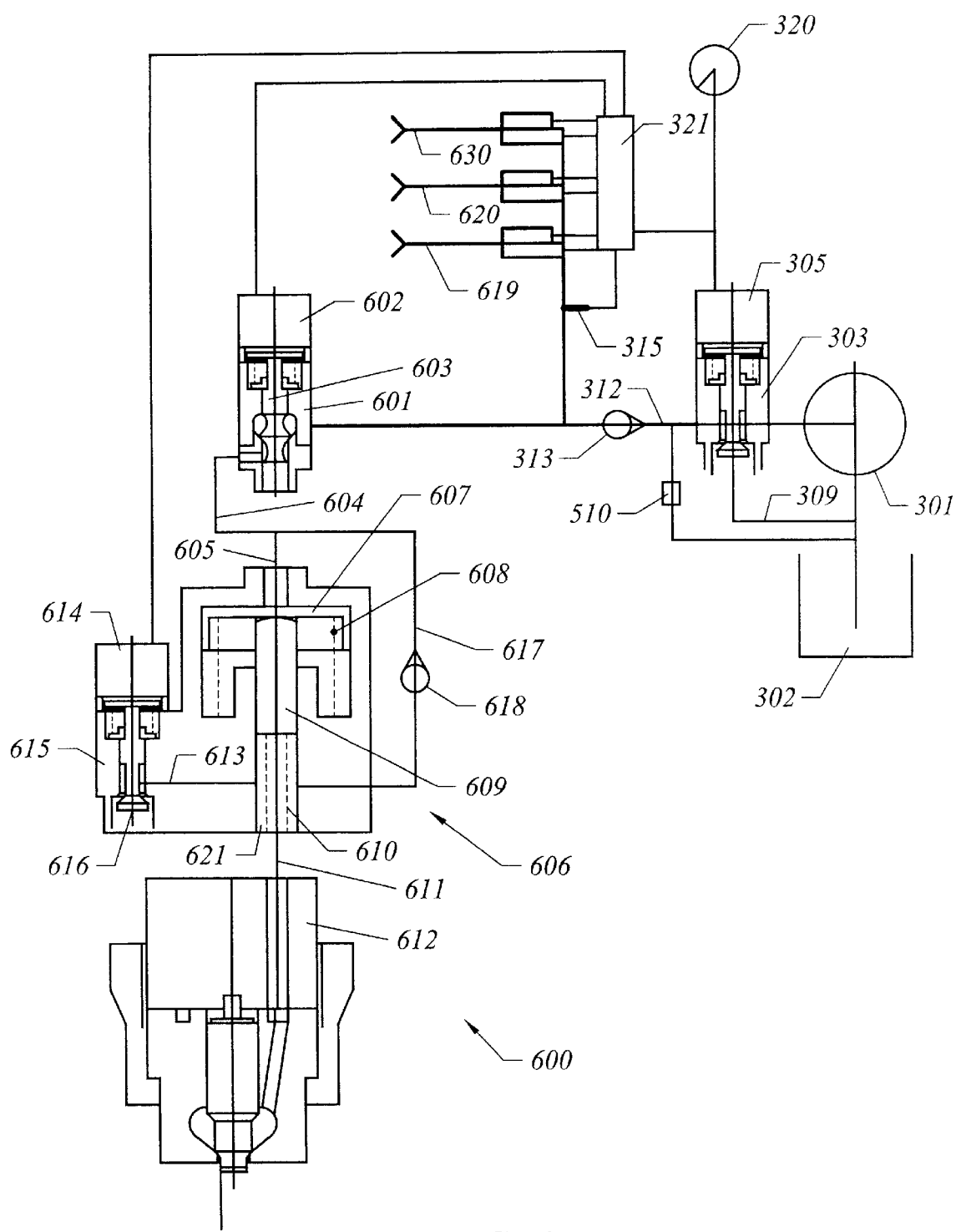
FIG. 6 is a schematic illustration of the sequential, common rail injection system having a controlled injection cutoff with a pressure amplifier module.

In FIG. 6, the sequential, common rail injection system designated generally by the reference numeral 600 and operable with an engine system described in FIG. 3, includes a supplemental pressure amplification module 606.

In the supplemented common rail injection system 600, there is included an electro-hydraulic valve 601 having a balanced valve spool 603 connecting common rail 322 with feed lines 604 and 605 to the pressuring amplification module 606. The pressure amplification module 606 is provided with a large piston 607, biased by a compression spring 608, acting on a plunger 609, biased by a compression spring 610. The plunger 609 pumps the high pressurized fuel through the feed line 611 in the injector 612. The feed line 613 is connected with the discharge valve 615 which is provided with a solenoid 614 and activated valve spool 616.

A bypass connection line 617 with a check valve 618 supplies the fuel to the cylinder chamber 321 of the pressure amplification module 606 and the connecting line 613 to the discharge valve 615. The other injectors 619, 620 and 630 shown schematically in FIG. 6 are similarly constructed and operated.

In operation the supplemented modular sequential injection system 600 starts the injection by a command from electronic control module 321 that is triggered by the cycle timing encoder 320. The electronic command causes the energizing of solenoid 305 to close the valve 305 and pressurize the common rail 322; the energizing of solenoid 602 to open the valve 601; and the energizing of solenoid 614 to close the discharge valve 615. The pressure of the common rail 622 acts through the valve 601 over piston 607 and coupled plunger 609 amplifying the injection pressure of the fuel in the cylinder 621 in the ratio of the area of the piston 607 over the area of the plunger 609.

The modular sequential injection by de-energizing all of the solenoids 305, 602 and 614 resulting in a pressure relaxation of the hydraulic pump 301 and a sharp pressure cutoff at the injector 612 by the opening of the discharge valve 615 and the closing of the electro-hydraulic valve 601 preserving the pressure in the common rail 322.

The return of piston 607 by the compression spring 608 drives fuel from the top of the amplification module 606 through bypass line 617 and check valve 118 refilling injection cylinder 610 with a new charge as plunger 609 rises with piston 607. The same sequence of operation is repeated with the other injectors 619, 620, and 630, schematically shown in FIG. 6.

Figure 7:
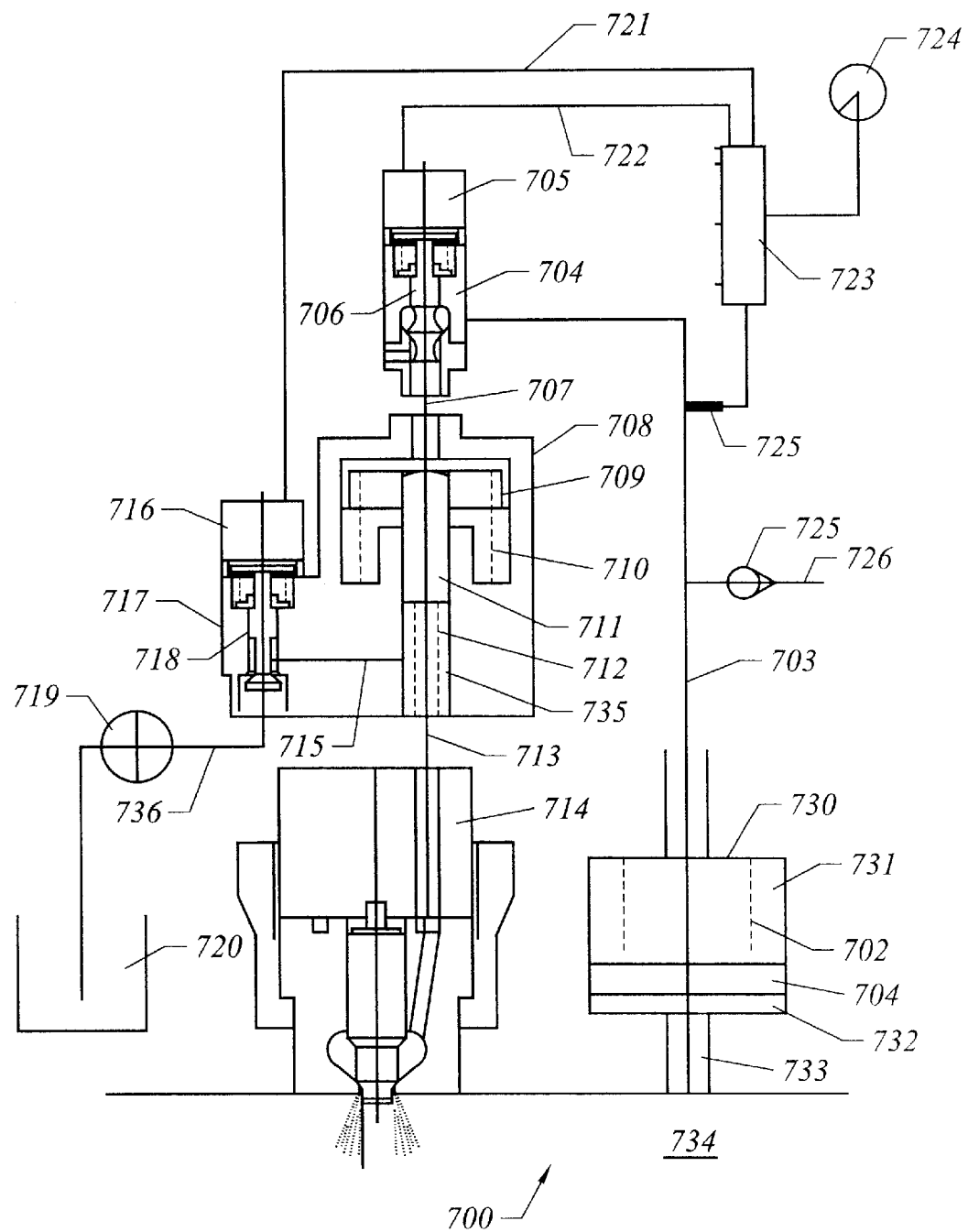
FIG. 7 is a schematic illustration of a sequential, common rail injection system having a controlled injection cutoff with a pressure amplifier module and gas-hydraulic pumping module.

In the arrangement of the sequential, common rail injection system of FIG. 7, designed generally by reference numeral 700, the system is modified as a self-injection system. Self injection is accomplished by inclusion of a gas-hydraulic pumping module 730 provided with a piston 701, a compression spring 702, and a hydraulic line 703 communicating with a fluid pumping chamber 731. On the opposite side of the piston 701 from the fluid pumping chamber 731 is a gas pressurizing chamber 732 with a communicating passage 733 to the combustion chamber 734, shown schematically in FIG. 7. In this manner, the pressure in the combustion chamber is reflected in the gas pressurizing chamber 732 which act on the fluid in the fluid pumping chamber 731 by displacement of the piston 701 against the return spring 702.

The hydraulic line 703 connects to the electro-hydraulic valve 704 provided with a solenoid 705 and actuatable valve spool 706 for controlling liquid passage to the pressure amplification module 708 through supply line 707. The pressure amplification module is provided with a large piston 709, biased by a spring 710, acting over a plunger 711, biased by a spring 712, in the injection cylinder 735. The injection cylinder 735 is connected by passage 713 to the injector 714 and by relief line 715 with the electro-hydraulic valve 717. The electro-hydraulic valve 717 is provided with a solenoid 716 and an actuatable valve spool 718. The valve 717 connects a fuel supply 720 to the injection cylinder 735 using a supply pump 719 for refilling the injector.

In operation injection starts upon processing a compression pressure signal received from the pressure transducer 725 which reflects the pressure in the combustion chamber 734. At a predetermined optimized compression pressure, as coordinated with a trigger signal from the encoder 724, the electronic control module 723 generates a command signal. The command signal causes the energizing of solenoid 705 opening electro-hydraulic valve 704 transmitting hydraulic pressure through line 707 over large piston 709 thereby amplifying the pressure produced by plunger 711 in the ratio of piston area over plunger area, for example, 10–15 times. Also, solenoid 716 is energized, closing electro-hydraulic valve 717 pressurizing the liquid in the injector module 708 and injector 714.

The injected fuel starts the combustion process raising the combustion chamber pressure with a corresponding rise in the injection pressure, proportionally amplified 10–15 times. A dynamically shaped injection pressure profile evolves that is the definition of an ideal injection system.

The modular sequential injection system stops the injection process by de-energizing the solenoids 705 and 716, which produces a sharp cut off of the injection and a gradual return of the large piston 709 and pumping piston 701 to their original position, recovering all of the energy accumulated in the amplification module during injection. In this manner the efficiency of the injection system is maximized.

Figure 8:
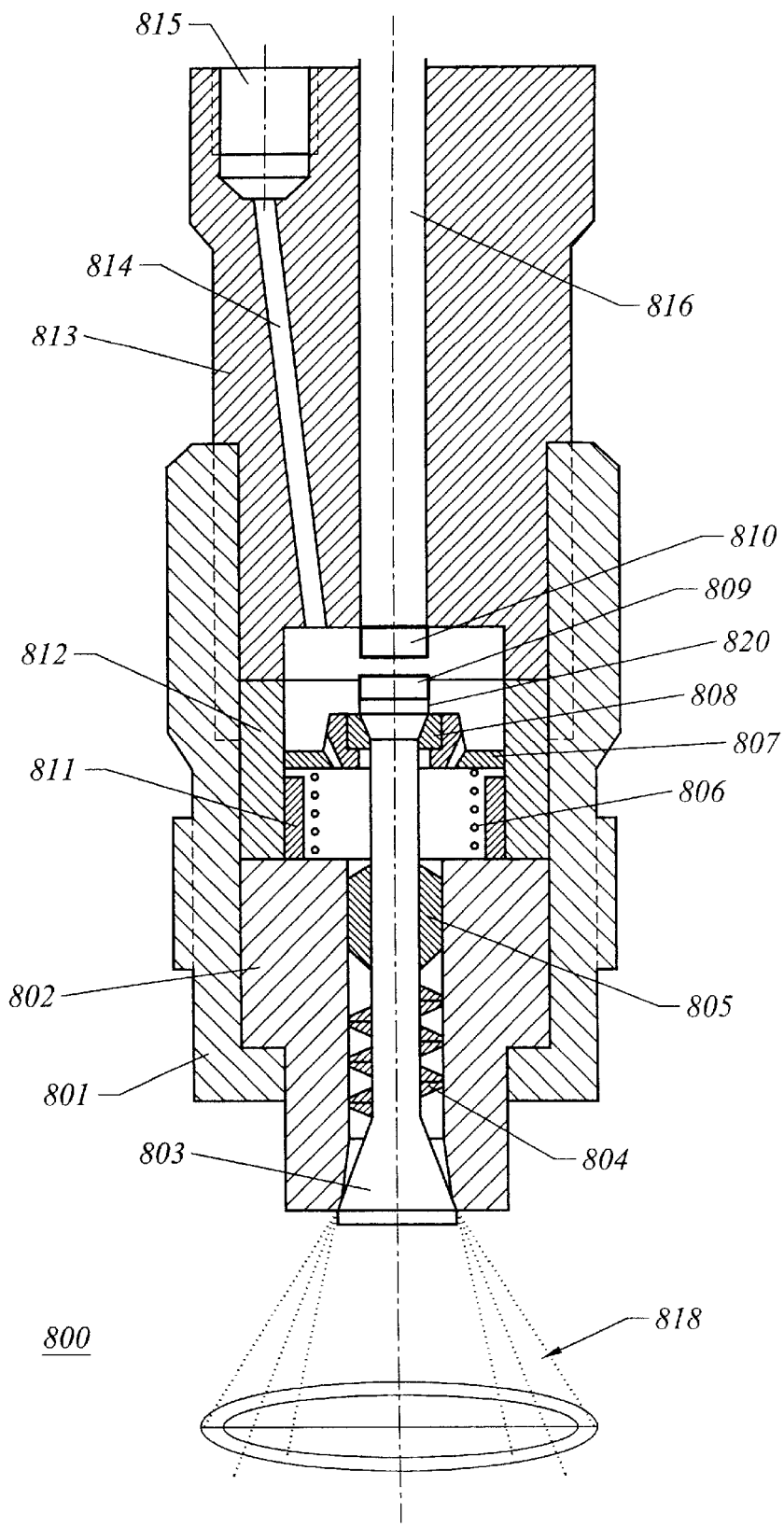
FIG. 8 is a cross-sectional view of a conical injector with a hollow, conical spray.
Figure 9:
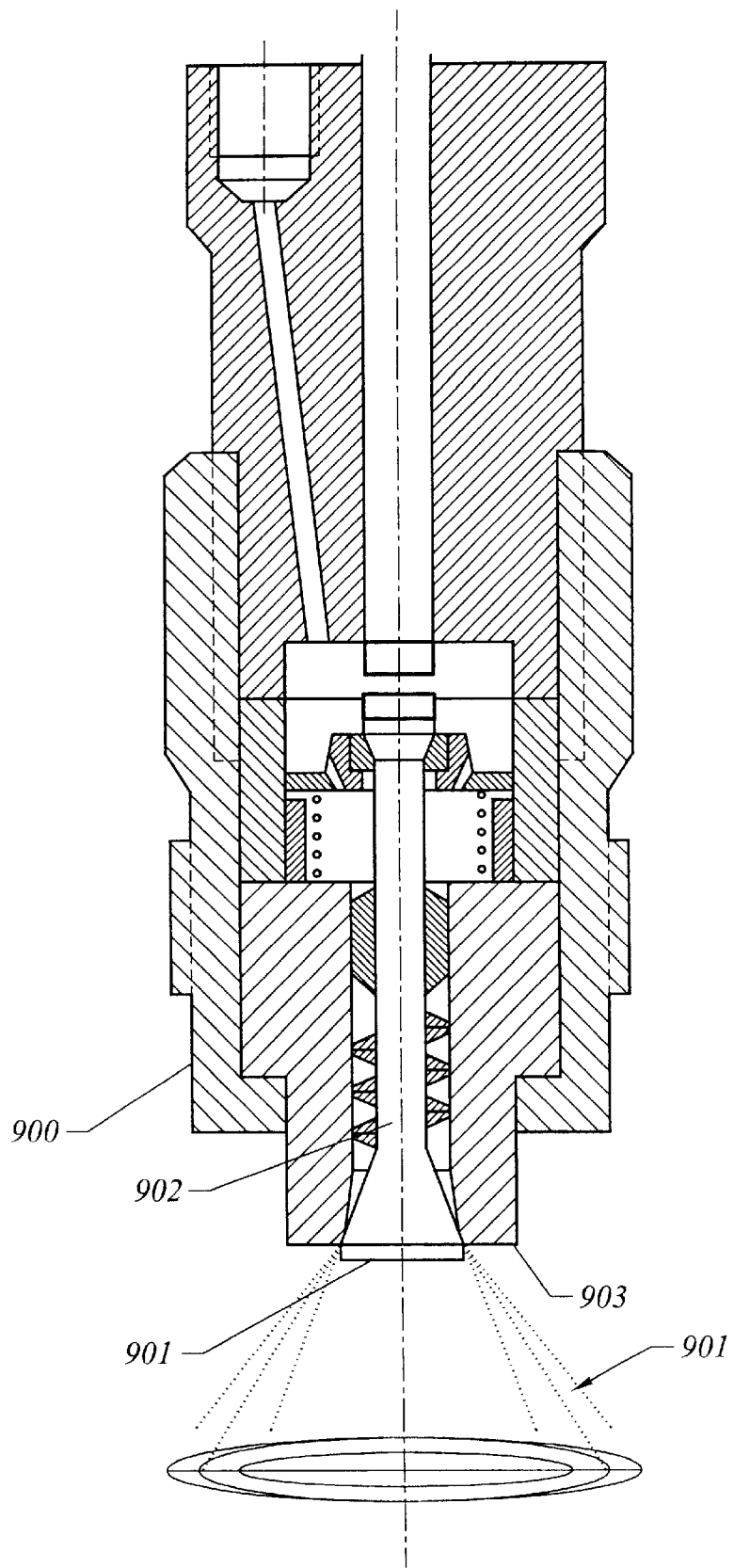
FIG. 9 is a cross-sectional view of the injector of FIG. 8 with a wider conical spray.
Figure 10:
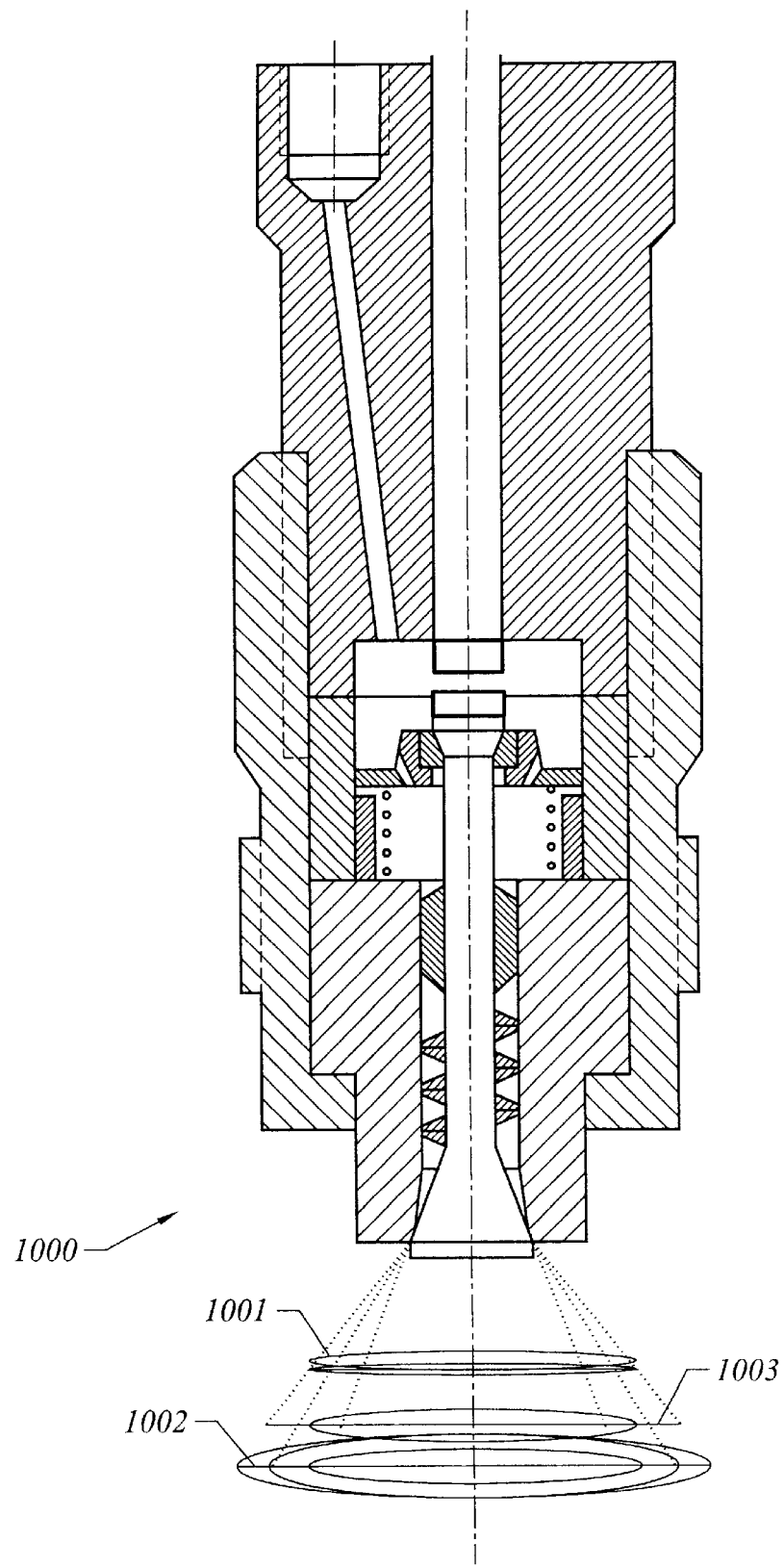
FIG. 10 is a cross-sectional view of the injector of FIG. 9 with a pulse injector spray.

Referring now to FIGS. 8–10, a preferred type of injector for use in the modular sequential injection system is shown. In FIG. 8, an injector, designated generally by the reference numeral 800 has a housing body in the form of a sleeve 801 having a nozzle 802 with a conical, outwardly displaceable valve 803. The valve has a spiral stem portion 804 and guide vane portion 805. The valve 803 is biased by a compression spring 806, engaging a spring head 807. The spring head 807 is connected to the end of the valve stem 820 by a split conical seating 808 in a recess on the spring head 807. The end of the valve stem 820 has a magnetic element that cooperates with a sensor transducer 810 to indicate the valve position.

The stroke of the valve 803 is limited by a slotted bushing 811 contained within outer bushing 812. The injector body 813 is provided with a fuel passage 814 and a supply port 815. An electrical conduct 816 of the transducer 810 transmits a signal responsive to valve movement to the electronic control module for continuous diagnostic control. The injector 800 of FIG. 8 has a hollow conical spray pattern 818, as shown.

In FIG. 9, the injector 900 has the identical components as that shown for the injector 800 of FIG. 8, but with a modified tip 901 of the valve 902 that co-acts with a modified chamber in the nozzle 903. This generates a wider conical spray pattern 904 as shown.

In FIG. 10, the injector 1000 is operated in a multiple injection pattern to produce a series of conical injection patterns 1001, 1002 and 1003 during each injection cycle.

Figure 11A:
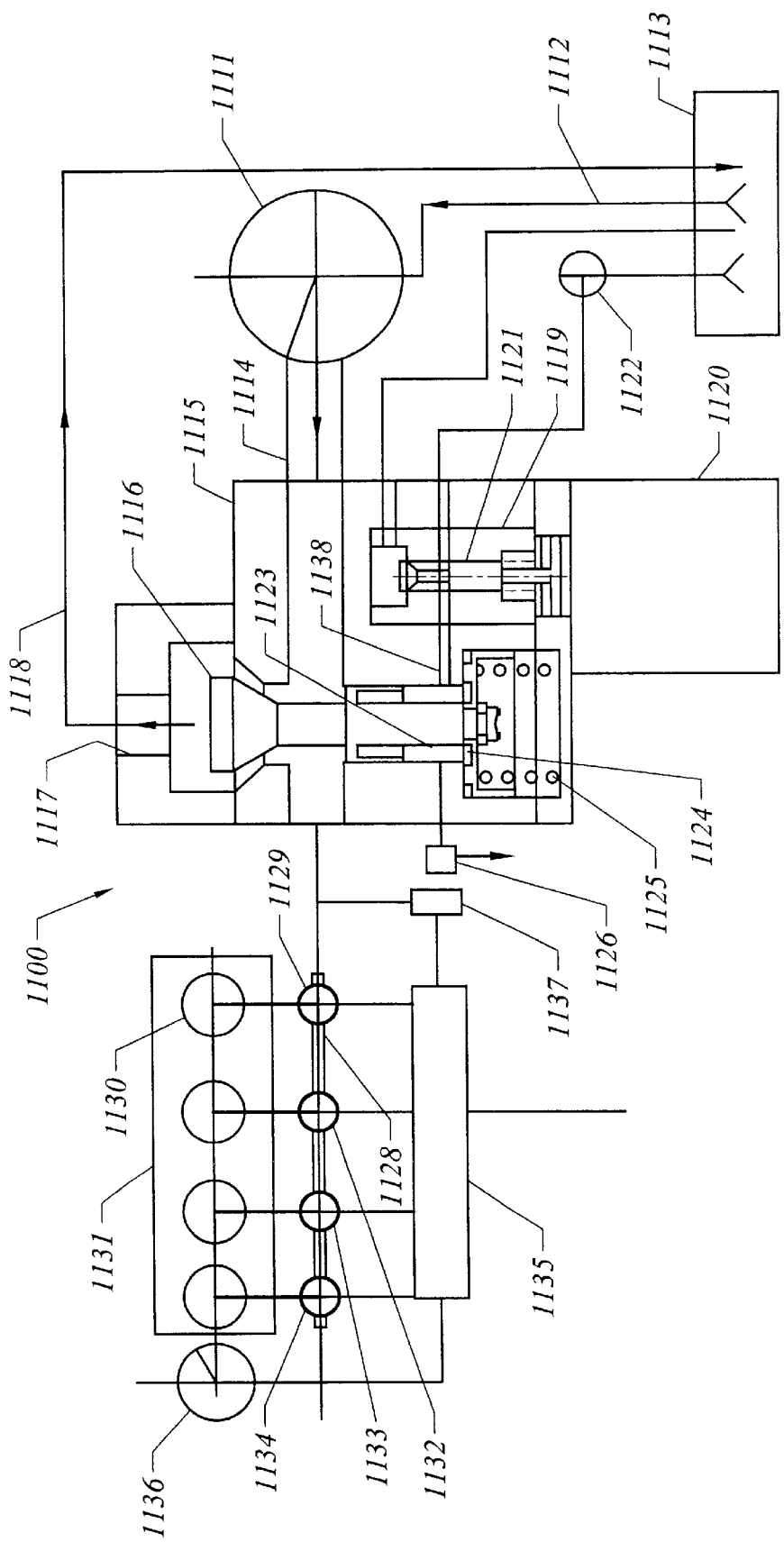
FIG. 11A is a schematic illustration of an improved sequential, common rail injection system adapted for a conventional engine with an open fuel return valve.
Figure 11B:
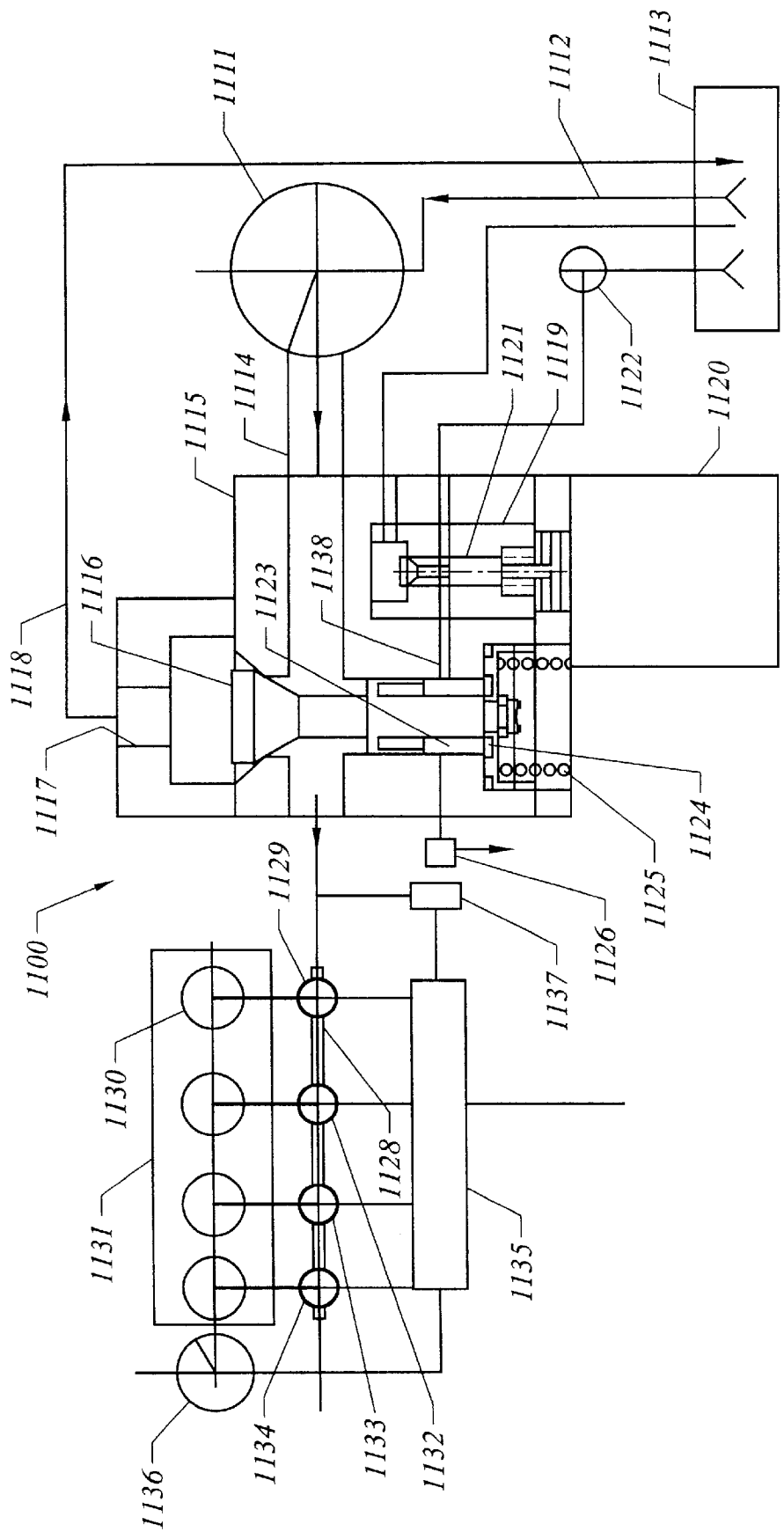
FIG. 11B is a schematic illustration of the improved sequential, common rail injection system of FIG. 11A with a closed fuel return valve.

Referring now to FIGS. 11A and 11B, an improved sequential, common rail, injection system is shown. The system of FIGS. 11A and 11B limits the existence of high pressure in the common rail to only the angular time of each injection. During the remaining time between injections the pressure of the rail is reduced to the level of the minimum pressure of the intake in an open recirculation loop.

As previously noted, a conventional common rail system continuously maintains a constant high pressure for the 360° crank rotation of a two stroke cycle or the 760° rotation of a four stroke cycle. If a normal injection time for one injection is 30° of crank rotation for the time of pumping, then in this case, it will be necessary to have twelve cylinders in a two stroke or twenty-four cylinders in a four stroke engine, if all the fuel is to be injected into the cylinders without waste. However, if the number of cylinders is less than twelve or twenty-four for the respective engine cycles, the conventional common rail systems are expending or "wasting" a large amount of energy through a valve "waste gate" between the injections. The lost energy is proportional to the level of pressurization of the common rail and is directly reflected in higher specific fuel consumption.

The system of this invention totally eliminates these losses which become significant when the injection pressure is more than 1000–2000 bar. In the system described herein the common rail pressure between injections is relaxed and all the fuel at high pressure is injected into the appropriate cylinder for maximum efficiency and zero energy loss.

In FIG. 11A, the sequential, common rail system is shown and designated generally by the reference numeral 1100. The sequential, common rail system has a primary high pressure pump 1111 that draws fuel through a fuel line 1112 from a fuel tank 1113 and pumps the fuel through the main supply line 1114 to an electro-hydraulic valve unit 1115. In FIG. 11A, the poppet 1116 of the electro-hydraulic valve unit 1115 is in an open position with the valve poppet 1116 extended as shown. In this position, fuel returns to the fuel tank 1113 through passage 1117 and return line 1118. In this mode of operation, no pressure is produced and the hydraulic circuit is in an open position.

Referring now to FIG. 11B, during the time of injection a servo valve 1119 in the electro-hydraulic valve unit 1115 is closed upon activation of a solenoid 1120 which displaces a spool poppet 1121. In this position, an auxiliary pump 1122 supplies a hydraulic fluid, such as fuel from the fuel tank 1113, through the servo valve 11 19 and passage 1138 to the differential plenum 1123 which acts on differential piston 1124 driving the piston against compression spring 1125 to retract the poppet 1116 and securely close the valve unit 1114. A pressure limit valve 1126 with a return line 1127 limits the maximum pressure that the auxiliary pump 1122 can develop for actuating the main poppet 1116 on closure. Any liquid bled by the pressure limit valve 1126 is returned to the hydraulic fluid source, which in the preferred embodiment is the fuel tank 1113.

In this mode of operation, the common rail 1128 is at its maximum pressure level, corresponding with the injection pressure for activating the first electronic injector 1129. After injection of fuel into the corresponding cylinder 1130 of engine 1131 the valve unit 1114 is switched by de-energizing the solenoid 1120 thereby allowing the compression spring 1125 to return the poppet 1116 to an open position as shown in FIG. 11A. In this manner, each of the four fuel injectors, 1129, 1132, 1133 and 1134, are sequentially activated only during the angular injection time, here selected as 30°. It is understood that the actual angular time of injection can vary from engine to engine and in fact during engine operation, since injection time is controlled by an electronic control module 1135 with input from the encoder 1136 connected to the crank shaft of the engine 1131 and the signal supplied by the pressure sensing transducer 1137.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. In a high pressure internal combustion engine having an engine cylinder and piston that reciprocates in the cylinder with a combustion chamber formed in substantial part by the piston and cylinder;
   a triple thermal cycle system for improved cooling and combustion comprising:
      an annular volume surrounding the cylinder with a thermally conductive structural member separating the annular volume and the combustion chamber;
      a constricted passage connecting the annular volume with the combustion chamber;
      a water injector positioned on the engine to inject water into the annular volume wherein on compression of air in the combustion chamber during a compression stroke, air enters the annular volume from the combustion chamber and on combustion of fuel in the combustion chamber and injection of water into the annular volume, air re-enters the combustion chamber through the constricted passages.

2. The triple thermal cycle system of claim 1 wherein the constricted passage is proximate the combustion chamber when the piston is at the end of its combustion stroke.

3. The triple thermal cycle system of claim 2 wherein the water injector is positioned at a location displaced from the constricted passage.

4. The triple thermal cycle system of claim 3 wherein the combustion chamber is circular and the constricted passage is oriented tangential to the circular combustion chamber.

5. The triple thermal cycle system of claim 3 wherein the annular volume comprises a cooling jacket with compressed air heated by the structural member separating the cylinder from the annular volume and injected water converted to steam in the annular volume driving compressed air with the steam into the compression chamber at the time of combustion in the combustion chamber.

6. The triple thermal cycle system of claim 5 wherein the water injector is oriented to inject a spray of water tangentially into the annular volume.

7. The triple thermal cycle system of claim 1 wherein the combustion chamber has a central portion and an outer portion wherein compressed air is squished from the outer portion through the constricted passage to the inner portion when the compression stroke of the piston is at an end.

8. The triple thermal cycle system of claim 7 including a fuel injector positioned on the engine to inject fuel into the constricted passage.

9. The triple thermal cycle system of claim 7 having a plurality of constricted passages.

10. The triple thermal cycle system of claim 9 wherein less than all constricted passages have a fuel injector positioned on the engine to inject fuel into the constricted passage.

11. The triple thermal cycle system of claim 7 wherein the engine has a pair of opposed pistons, one of said pistons having an end with a circular recess and the other of said pistons having an end with an annular crown insertable into the recess, wherein the constricted passage is at least in part through the annular crown.

12. The triple thermal cycle system of claim 1 in combination with a sequential, common rail injection system having a liquid pump, a plurality of injectors, a common rail supplying a liquid to the injectors, an electronic control module controlling the sequential supply of liquid to the injectors, a liquid supply, and an electro-hydraulic valve connected to the common rail with a return bypass circuit to the liquid supply and a check valve between the electro-hydraulic valve and the common rail to maintain a high pressure in the common rail, wherein the electro-hydraulic valve is activated to pump the liquid from the liquid supply to the common rail substantially during periods of injection wherein the liquid pump operates as a high pressure pump and, wherein the electro-hydraulic valve is de-activated substantially during period of non-injection wherein the liquid pump operates as a low pressure circulating pump.

13. The triple thermal cycle system of claim 12 wherein the liquid is fuel and the injectors inject fuel into the combustion chamber.

14. The triple thermal cycle system of claim 12 wherein the liquid is water and the injectors inject water into the annular volume surrounding the cylinder.

15. In a high pressure internal combustion engine having an engine cylinder and piston that reciprocates in the cylinder with a combustion chamber formed in substantial part by the piston and cylinder;
   a sequential, common rail injection system comprising:
      a liquid pump;
      a plurality of injectors;
      a common rail supplying a liquid to the injectors;
      an electronic control module controlling the sequential supply of liquid to the injectors, a liquid supply; and,
      an electro-hydraulic valve connected to the common rail with a return bypass circuit to the liquid supply and a check valve between the electro-hydraulic valve and the common rail to maintain a high pressure in the common rail, wherein the electro-hydraulic valve is activated to pump the liquid from the liquid supply to the common rail substantially during periods of injection wherein the liquid pump operates as a high pressure pump and, wherein the electro-hydraulic valve is de-activated substantially during period of non-injection wherein the liquid pump operates as a low pressure circulating pump, wherein the injection system includes a pressure amplifier module for each injector arranged between the common rail and the injector and an electro-hydraulic supply valve between the common rail and amplifier module connected to the electronic controls module for controlling supply of liquid to the amplifier control module, wherein the amplifier control module has a large piston with a liquid chamber for displacing the large piston when liquid is supplied to the chamber on activation of the electro-hydraulic supply valve, and a small piston connected to the large piston with a fuel chamber connected to a fuel supply, wherein the amplifier control module has an electro-hydraulic fuel valve between the fuel supply and the fuel chamber connected to the electronic control module, wherein on activation fuel supplied to the fuel chamber is pressurized by the displaced large piston and small piston, and on de-activation fuel pressure is relieved with fuel circulating to the fuel chamber.

16. The sequential, common rail injection system of claim 15 wherein the engine has a plurality of cylinders and each cylinder has an injector, the injectors being operated in sequence by the electronic control module.

17. The sequential, common rail injection system of claim 15 wherein the engine has a single cylinder with a plurality of injectors tangentially arranged around the cylinder, the injectors being operated in an overlapping sequence by the electronic control module.

18. The sequential, common rail injection system of claim 15 wherein the injection system includes a self-injection system including a liquid pumping chamber and a gas pressurizing chamber with a displaceable piston separating the liquid pumping chamber from the gas pressurizing chamber, the gas pressurizing chamber having a passage communicating with the combustion chamber, wherein the liquid pumping chamber has a conduit connected to the electro-hydraulic valve and to the liquid supply with a check valve between the liquid supply and the conduit.

19. The sequential, common rail injection system of claim 15 wherein the injectors have a valve nozzle with a stem valve which cooperates with the nozzle to inject a hollow-conical spray.

20. In a high pressure internal combustion engine having engine cylinders and pistons that reciprocate in the cylinders with combustion chambers formed in substantial part by the pistons and cylinders;

a sequential, common rail injection system comprising:
 a first liquid pump;
 a plurality of injectors;
 a common rail supplying a liquid to the injectors for sequential injection into the cylinders;
 an electronic control module for electronically controlling the sequential supply of liquid to the injectors from the common rail;
 a liquid supply; and,
 an electro-hydraulic valve unit with a supply passage connected to the common rail with a return bypass circuit to the liquid supply wherein the electro-hydraulic valve unit is activated by the electronic control module to pass the liquid from the liquid supply by the first liquid pump to the common rail substantially during periods of injection wherein the first liquid pump operates as a high pressure pump and pumps liquid to the common rail and, wherein the electro-hydraulic valve unit is deactivated by the electronic control module substantially during periods of non-injection, wherein the first liquid pump operates as a low pressure circulating pump, wherein the sequential, common rail injection system includes a second liquid pump with a liquid supply passage to the electro-hydraulic valve unit, and the electro-hydraulic valve unit includes a solenoid operated valve that on electronic activation hydraulically activates the electro-hydraulic valve unit by liquid from the second liquid pump during periods of injection.

21. The sequential, common rail injection system of claim 20 wherein the electro-hydraulic valve unit includes a poppet and connected piston, wherein the solenoid operated valve controls the supply of liquid from the second liquid pump to the piston for displacing the piston and passing liquid to the common rail from the first liquid pump.

* * * * *